United States Patent

[11] 3,612,303

[72] Inventor Sukeyoshi Ikeda
 Yao, Japan
[21] Appl. No. 863,993
[22] Filed Oct. 6, 1969
[45] Patented Oct. 12, 1971
[73] Assignees Hitachi Shipbuilding & Engineering Co., Ltd.
 Osaka, Japan;
 Keiichi Miyazaki
 Tokyo, Japan, part interest to each
[32] Priority Oct. 5, 1968
[33] Japan
[31] 43/72624

[54] MARINE BULK CARGO LOADING ARRANGEMENT
 5 Claims, 12 Drawing Figs.
[52] U.S. Cl. ................................................. 214/15 E,
 114/202
[51] Int. Cl. ................................................. B65g 65/02
[50] Field of Search ................................................. 114/202;
 214/15 R, 15 A, 15 D, 15 E

[56] References Cited
 UNITED STATES PATENTS
 1,928,859 10/1933 Kutscha ........................ 214/83.36 X
 2,379,231 6/1945 Harrison ........................ 214/15
 2,532,249 11/1950 Ward ........................ 214/15 D
 FOREIGN PATENTS
 1,299,699 6/1962 France ........................ 114/202

Primary Examiner—Gerald M. Forlenza
Assistant Examiner—Frank E. Werner
Attorney—Tab T. Thein ABSTRACT: Material-handling arrangement, such as in a bulk freighter, for loading and unloading bulk cargo by the use of a main conveyor mounted by the side of the hatches. There are two kinds of hatch cover panels, one being used only for the purpose of closing the respective hatch, and another kind both for shutting the hatch and for handling the cargo. A closable hopper is provided as well as a traversing conveyor, whereby the function of delivering the cargo into a hold, supplied from the main conveyor, can be achieved, and whereby the function of delivering the cargo from the hopper to the main conveyor can also be obtained so that the hatch cover is utilized for cargo handling.

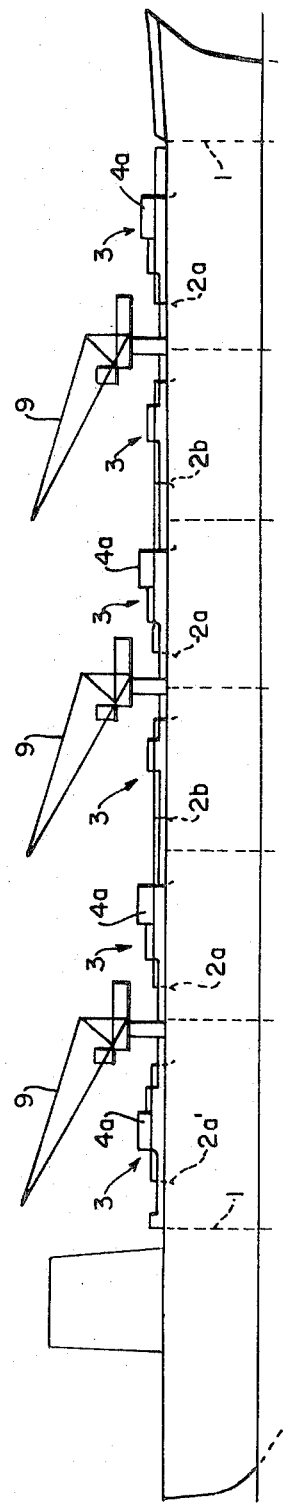
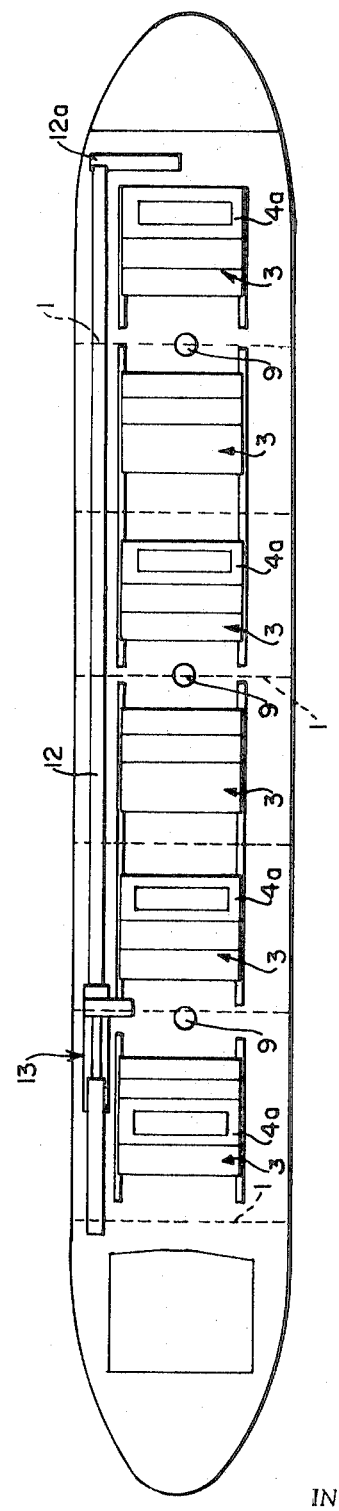

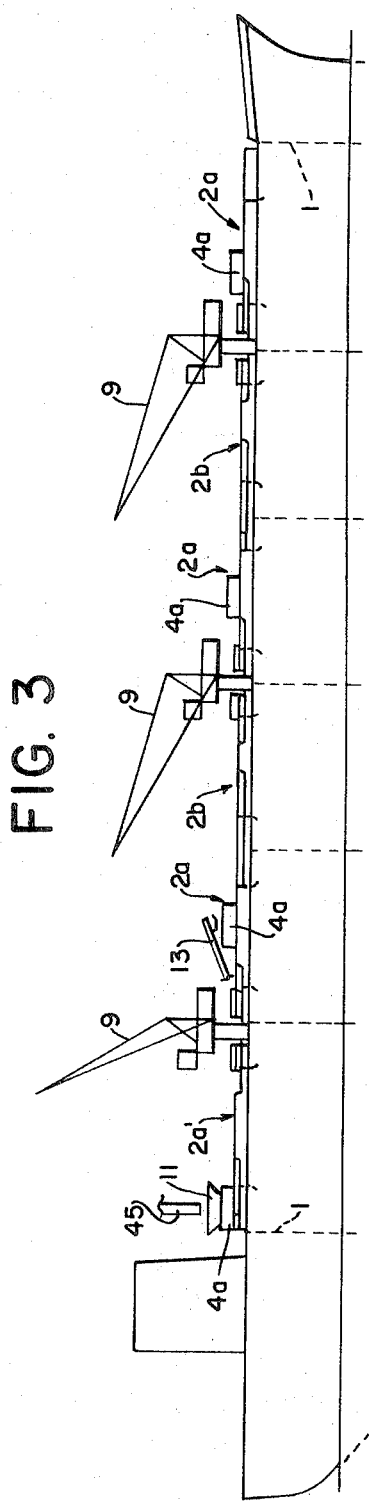
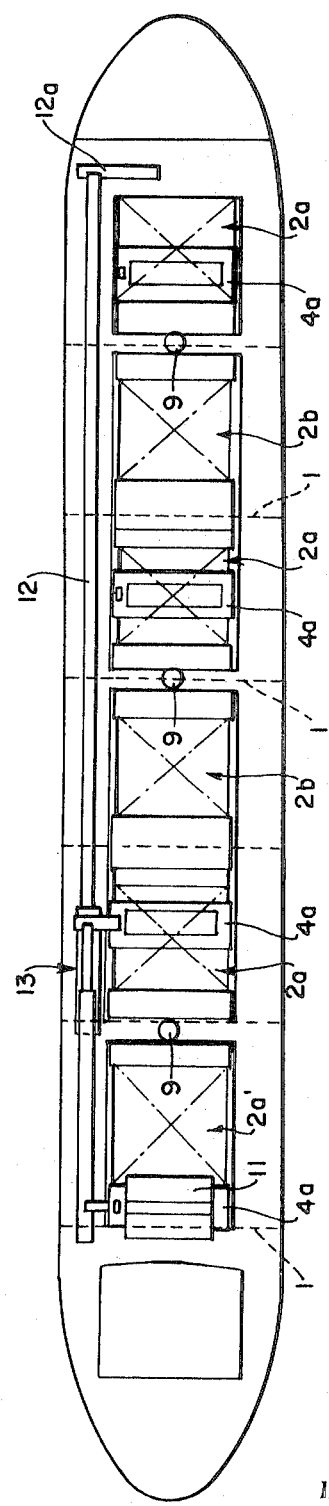

INVENTOR.
SUKEYOSHI IKEDA

BY

AGENT

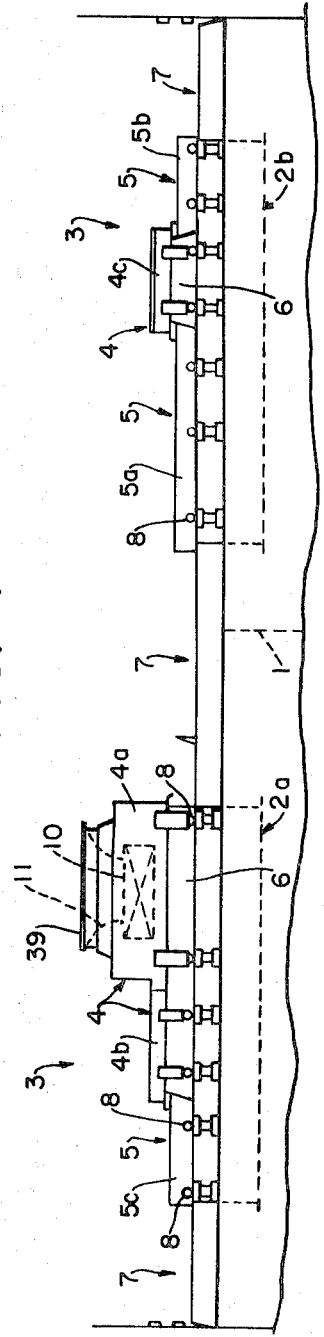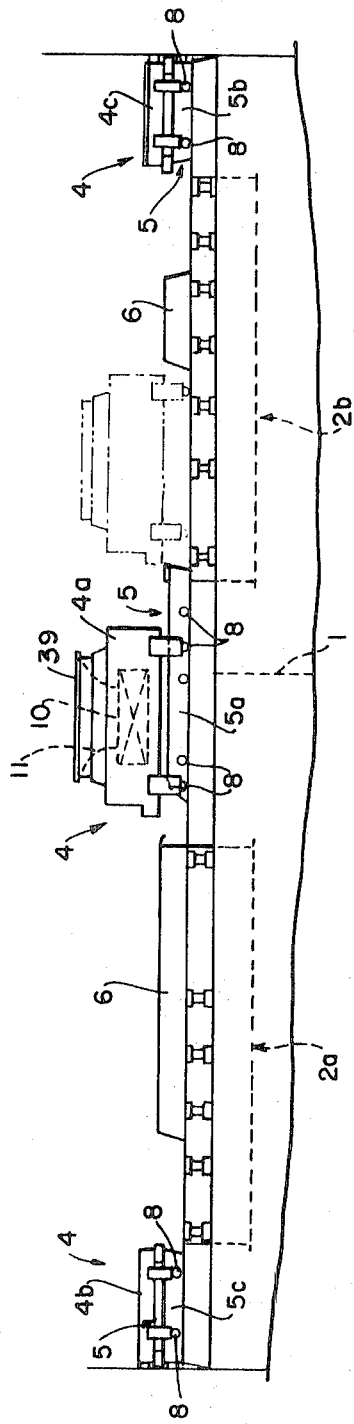

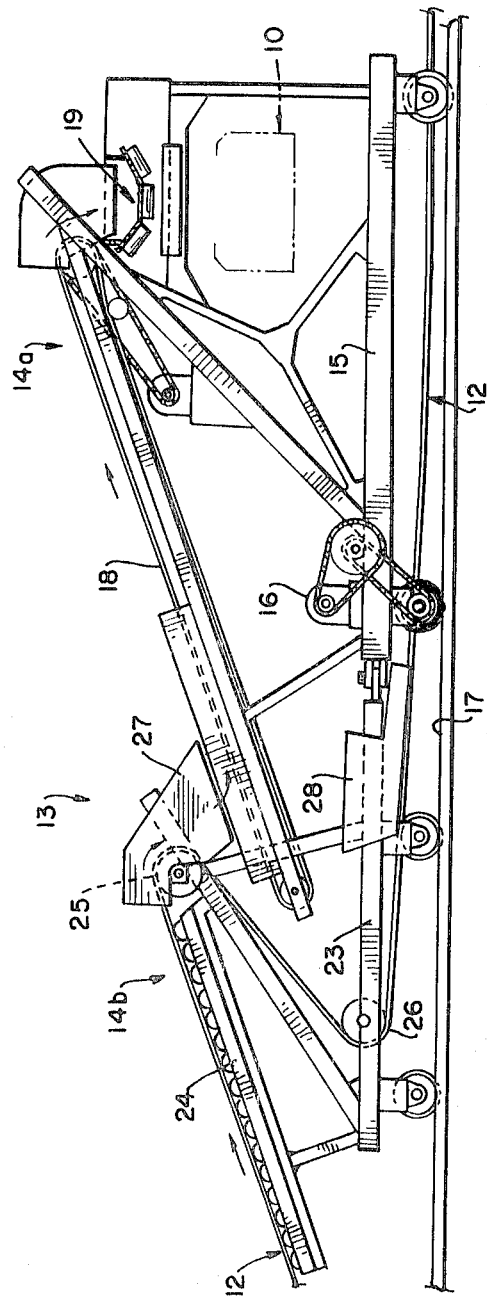

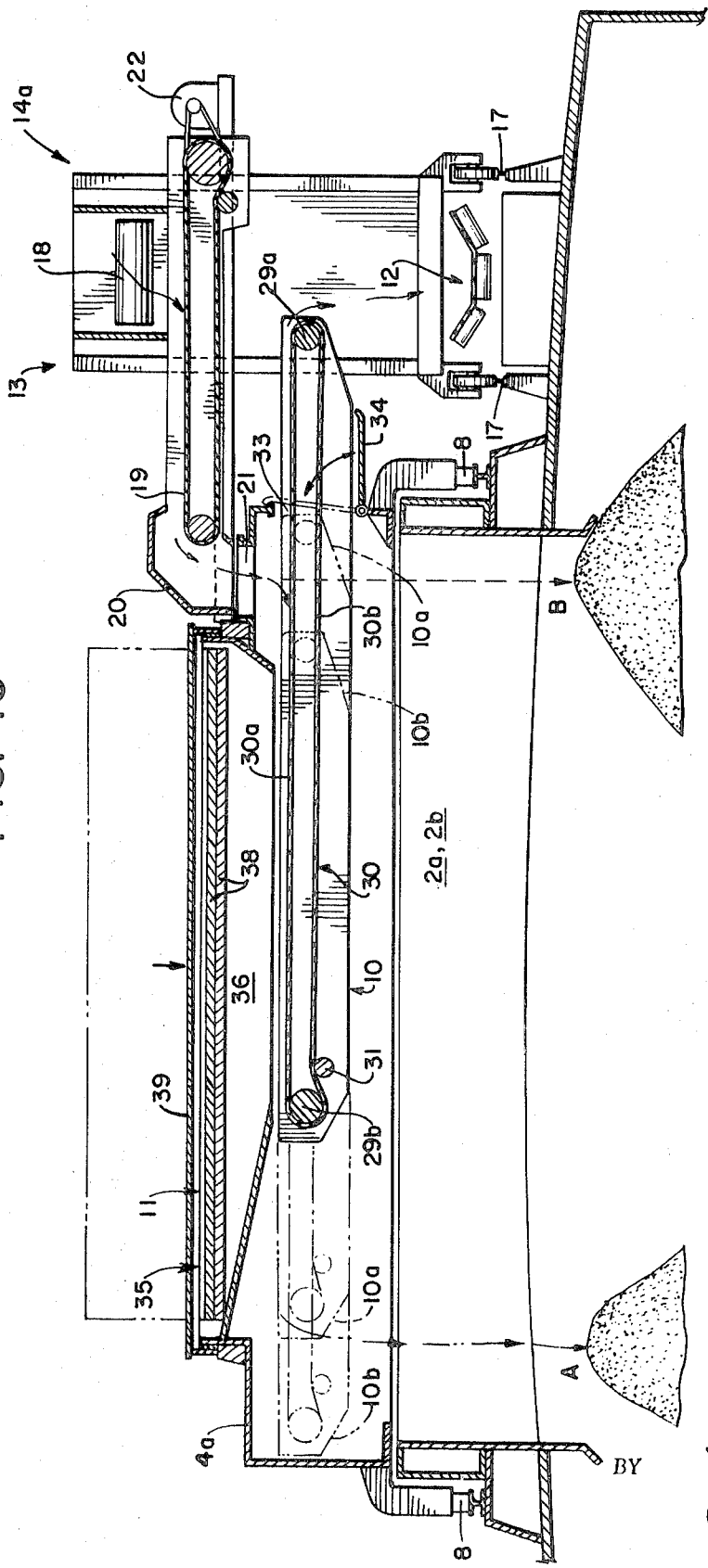

MARINE BULK CARGO LOADING ARRANGEMENT

So far compressed-air transporting and material-handling machines have been used in freighters as automatic loading gear, to transport bulk cargo, for example wood chips, in addition to trimmer-and-belt conveyor means, turning chute means and other kinds of equipment.

A cargo gear arrangement in a bulk freighter has recently been proposed, comprising conveyor means, trimmer means for said conveyor, tripper means which has a built-in turning chute and an intermediate conveyor, and a travelling crane provided with a hopper for unloading on a deck by the side of the hatches.

This arrangement has been found useful for loading and unloading bulk cargo; however it is complicated in its mounting on the deck and, what is worse, it has the defect that bulk cargo, as wood chips, dropped from a grab bucket, scatters over the ship and contaminates the sea because a loading hopper is positioned alongside, and this defect causes waste of the cargo.

Furthermore the deck becomes narrow because a travelling crane is used in this arrangement, and such a crane is a costly addition to the above-mentioned conveyor means, tripper means and the like. Thus the defects of known cargo gear arrangements have still remained unimproved.

A main object of the present invention is to improve the above-mentioned defects in conventional cargo gear arrangements.

THe present invention provides a cargo handling and loading arrangement characterized in that it comprises hatch covers having two kinds of hatch panels, one being used only for closing the hatch, and another serving both for shutting the hatch and for cargo handling. A built-in traversing conveyor and a closable hopper are provided. THe traversing conveyor has the function of delivering the bulk cargo into a hold, supplied from the main conveyor mounted by the side of the hatches, and of delivering the cargo from the hopper to the main conveyor.

While the just outlined arrangement according to the present invention is adapted to cargo handling in general, the loading and unloading of bulk cargo can be rationally and efficiently carried out. Only if a fixed crane and a main conveyor are provided as auxiliary equipment, can the arrangement be well used. Of course the tripper means are used to deliver the loaded bulk cargo to a traversing conveyor means within the hatch panels.

The above-mentioned main conveyor is mounted by the side of the hatches to transfer the unloaded bulk cargo supplied from the traversing conveyor means. The fixed crane is mounted to lift the bulk cargo within the hold to the hopper.

Cargo handling with the inventive arrangement will be explained hereinafter. Loading into a hold under each hatch can be carried out without exception by transporting the bulk cargo from the main conveyor, located by the side of the hatches, to the tripper means and to the traversing conveyor means built into the hatch panels, serving also for cargo handling, and then to the hold.

Unloading from a hold under each hatch is carried out by transporting the cargo from a grab bucket of a fixed crane, holding the cargo from within the hold, to the closable hopper of a hatch panel, serving also for cargo handling, to the traversing conveyor means of the same panel and to the main conveyor by the side of the hatches.

Thus the application of a hatch cover, which is used originally for opening and shutting the respective hatch, also for cargo handling, simplifies the installation of the inventive arrangement on the deck. This is a marked advantage of the present invention.

It is a further advantage to be able to utilize a fixed crane in the arrangement. A still further advantage is to decrease the costs of equipment and of cargo handling as such. It is a still further advantage of the present invention that the deck can be used more efficiently.

Still another advantage is to avoid scattering the bulk cargo over the freighter and into the sea because at a hopper over a hatch the bulk cargo may drop from the grab bucket. This advantage results in saving bulk cargo and in preventing the cargo from scattering and contaminating the sea.

Further characteristics, advantages as well as the operative effect of the inventive marine bulk cargo loading arrangement will become apparent from the following detailed description when considered in conjunction with the accompanying drawings, wherein FIG. 1 is a somewhat schematic side view of a bulk freighter in the shut condition of its hatches, incorporating the inventive cargo-loading arrangement;

FIG. 2 is a plan view of the freighter shown in FIG. 1;

FIG. 3 is a side view of the freighter of FIGS. 1 and 2 in the condition of loading;

FIG. 4 is a plan view of the freighter shown in FIG. 3;

FIG. 7 is a side view showing two shut hatches of the freighter between cranes;

FIG. 8 is a side view of two opened hatches of the freighter;

FIG. 9 is a side view showing tripper means connected with a main conveyor by the side of the hatches of FIGS. 7 and 8;

FIG. 10 is a longitudinal sectional elevation showing the relation of an upper hatch panel for cargo handling to the main conveyor;

Figure 5:
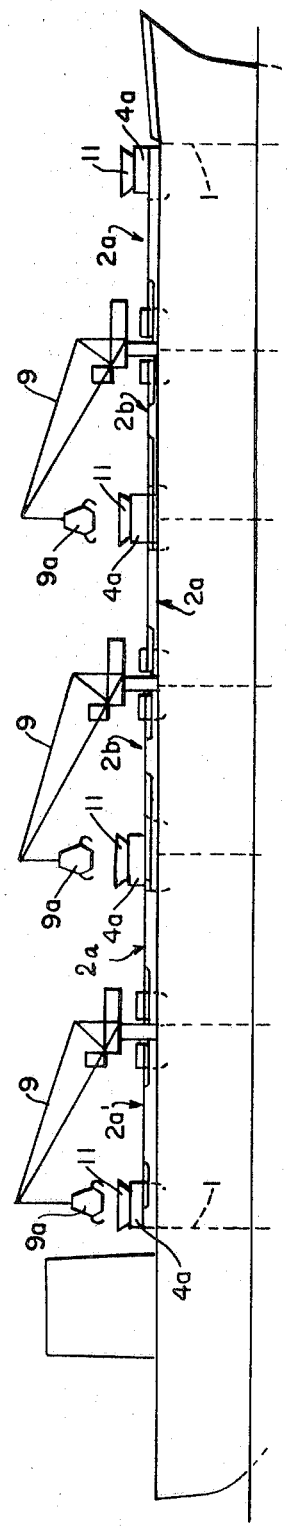
FIG. 5 is a side view of the freighter of FIGS. 1 to 4 in the condition of unloading.

FIGS. 1 and 2 are schematic illustrations of a bulk freighter equipped with a cargo-loading arrangement according to the present invention, showing shut hatch covers 3. The freighter has several holds, divided between fore and aft, among bulkheads 1, and the deck is equipped with hatches 2a, 2b including appropriate coamings. Hatch covers 3 of hatches 2a, 2b close of upper hatch panels 5 as shown in FIG. 7. Upper hatch panels 4 are used to open and close the upper parts 6 of the hatch coamings, again as shown in FIG. 7. Hatch 2a' will be described somewhat later.

In accordance with the present invention, there are two kinds of hatches, one having two hatch panels, namely 4a and 4b to open and close the upper parts 6; the lower hatch panels 5a, 5b are positioned on both sides of the upper parts 6, and one lower panel 5c is used for hatches 2a. Whichever kind a hatch may be, both upper and lower hatch panels 4, 5 are adapted to slide between sheds 7 mounted on the deck before and behind the respective hatches and the shut hatches. Reference numeral 8 identifies a wheel for moving the hatch panels 4, 5 along a guide rail (not shown).

FIG. 8 shows hatches 2a, 2b in the opened condition, and the upper and lower hatch panels 4, 5 are each housed in a shed so that these panels may be located one above another.

In FIGS. 1 and 2, numeral 9 identifies deck cranes, and each crane is rotatable about an angle of 360° and is positioned on the upper deck of the freighter between the hatches so as to be useful for unloading the cargo from the holds located before and behind each crane. In FIG. 5, the cranes 9 are shown with grab buckets 9a.

The number of holds to which each crane is assigned is decided in accordance with the arrangement and capacity of the deck cranes and holds. As a matter of fact the number of holds is not limited to that shown in the figures. One of the hatches 2a, equipped with the above-mentioned two upper hatch panels, is located in each hold of the bow and the stern, and is located in one of two holds between the deck cranes 9, as is shown in FIGS. 1 and 2.

Figure 12:
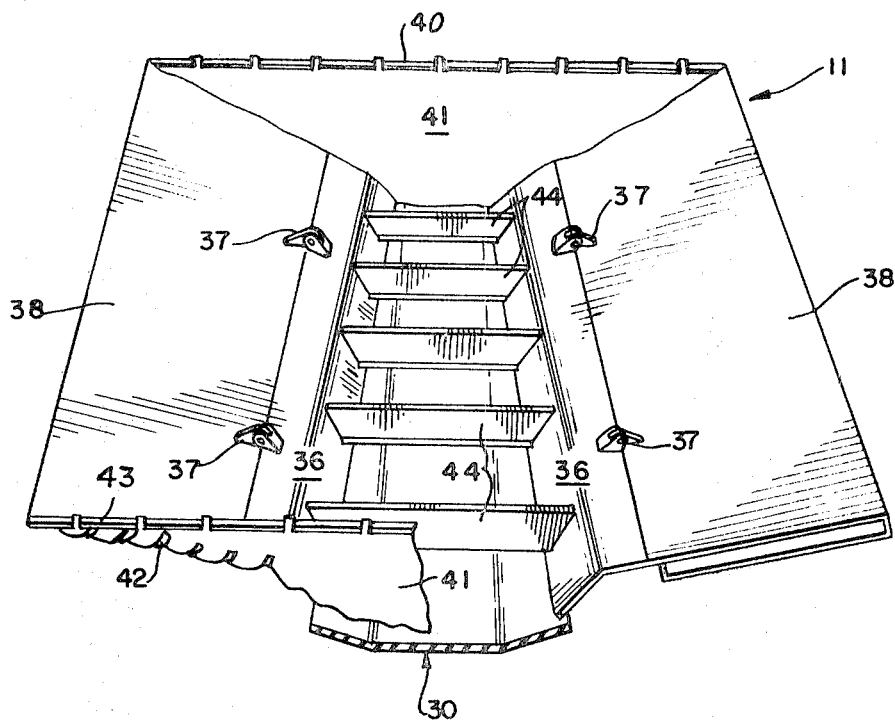
FIG. 12 is a perspective view showing the hopper from above, in the opened condition.

With regard to the upper hatch panels, one of these is made higher than the other panels, namely 4b and 4c, as is shown in FIG. 7 at 4a, in which a traversing conveyor 10 and a closable hopper 11 for the conveyor are provided, as shown in FIGS. 10 and 12. The hopper 11 will be described later in more detail.

As shown in FIG. 8 in dot-dash lines, hatch panel 4a is capable of being moved above another hatch 2b between the deck cranes 9, and is useful for both loading and unloading, in addition to the original purpose of covering the hatch 2a.

Reference numerals 12, 12a in FIG. 2 denote a main conveyor installed lengthwise of the freighter, which has a tripper 13 to be described later in more detail. This tripper include a self-travelling tripper 14a movable in either direction along conveyor 12, and a driven tripper 14b adapted to be connected to or disconnected from tripper 14a. The latter travels along rails (see FIG. 10) mounted on the upper deck on both sides of conveyor 12, by means of a drive 16 installed on a part of a truck 15 which has a sloping conveyor 18 installed on its upper part.

Conveyor 18 has below its upper end a fixed subtraversing conveyor 19 standing out towards the center of the hull, and a lower opening of a chute 20 attached to conveyor 19, adapted to be aligned with a closable loading opening 21 (see FIG. 10) mounted on the upper side of upper hatch panel 4a which is suited for cargo handling. Reference will be had somewhat later to the loading opening 21 of panels 4a as the specification proceeds. Reference numeral 22 identifies a drive for actuating conveyor 19.

In loading, tripper 14b travels along rails 17 together with tripper 14a, by connecting trucks with each other, including a sloped material or platform 24 over a truck 23, wherein the upper belt of main conveyor 12 is extended around a guide roller 25 on the upper end of stock 24 and a guide roller 26 of truck 23, and wherein the bulk cargo delivered along conveyor 12 is moved through a guide plate 27 from the upper end of stock 24 to the lower part of conveyor 18 of tripper 14a.

In unloading, the bulk cargo on main conveyor 12 can also be transported without trouble through the aforementioned tripper 13, by disconnecting self-travelling tripper 14a from driven tripper 14b. In this case, the cargo dropped from roller 25 will be transferred to the belt of conveyor 12 through plate 27 and another guide plate 28.

On the other hand, traversing conveyor 10 within upper hatch panel 4a has an endless belt 30, as shown in FIG. 10, passing about a pair of rollers 29a, 29b, and being driven in either direction by a drive 31 acting upon the lower belt section 30b. The upper belt section 30a is trough-shapedly supported by several rollers 32; this is illustrated in detail in FIG. 11.

The just-described conveyor structure 10 can also be moved transversely within upper panel 4a by the use of another drive (not shown), and especially can be positioned over main conveyor 12 from a closable opening 33. The latter is provided on one side of the upper panel 4a for proper cargo handling.

The bulk cargo supplied from hopper 11, associated with traversing conveyor 10, can be delivered to conveyor 12 by moving laterally conveyor 10 to locate its end over conveyor 12, as shown in full lines in FIG. 10. Also the bulk cargo, supplied through tripper 13, conveyor 19, chute 20 and its loading opening 21 from conveyor 12 into panel 4a, can be loaded at the left-side point A of the hold as shown in FIG. 10 by laterally moving conveyor 10 to the position 10a shown in dot-dash lines.

The cargo supplied from a loading opening and dropped directly into the hold, without the use of traversing conveyor 10, can be loaded at the right-hand side, at point B of the hold in FIG. 10, by moving conveyor 10 to the above-mentioned position 10a. A door 34 for opening 33 can be closed in order to use conveyor 10 in the positions 10a, 10b, the latter identifying the extreme left-hand position within panel 4a.

Figure 11:
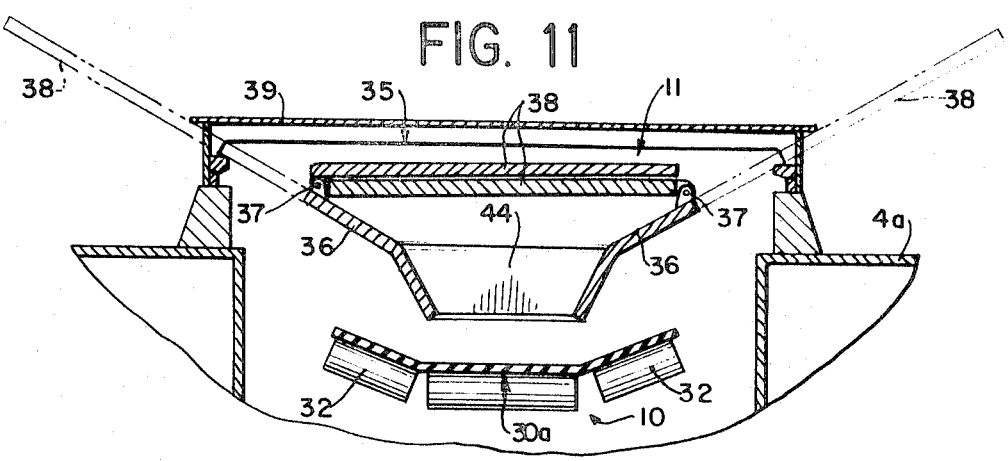
FIG. 11 is a longitudinal sectional side view showing a closable hopper within an upper hatch panel for cargo handling.

As illustrated in FIGS. 10 to 12, the above-mentioned hopper 11 includes: (a) an oblong loading opening 35 provided along conveyor 10 on the upper side of hatch panel 4a; (b) downsided lower guide plates 36 leading the cargo delivered to opening 35 to belt 30 (shown in FIG. 10 in full lines); (c) a pair of movable upper guide plates 38 attached to the upper edges of both longitudinal sides of plats 36 by means of hinges 37 so as to be able to tilt plates 39; and (d) a cover 39 adapted to be opened and closed, whereby to shut opening 35 in a watertight manner.

Upper guide plates 38 have upper rods 40 disposed for fitting a canvas 41 along both longitudinal ends of plates 38, as is shown in FIG. 12. Lower rods 43 are utilized to fix, by the use of strings 42, the lower ends of canvas 41 to the sides of plates 38 when the canvas is extended between the plates 38 so that the canvas fills a triangular space formed at both ends of the plates 38, unfolded wide towards the end, as is shown in dot-dash lines in FIG. 11 and in full lines in FIG. 12.

Reference numeral 44 shows plates spanned between lower guide plates 36, useful for crushing the lumpy bulk cargo to be delivered to hopper 11. Thus the hopper has its opening 35 closed by means of the aforementioned cover 39 after upper guide plates 38 are folded inside, as shown in FIG. 11, when it is not in use.

With regard to loading, the manner of operating the above-described marine bulk cargo loading arrangement such as for a bulk freighter will be explained in the following. As is shown in FIGS. 3 and 4, the hatches 2a, 2b are opened first. In this case, all the hatch panels 4b, 4c, 5a, 5b, 5c (except the loading upper hatch panel 4a) are housed in sheds 7, as illustrated in FIG. 8. Then the bulk cargo (hereinafter referred to as being wood chips) is delivered from a loading chute 45 (see FIG. 3) of a conventional loading device on land to the earlier mentioned opened hopper 11 of upper hatch panel 4a of hatch 2a in the stern of the bulk freighter, as shown.

In this case the chips are transported along main conveyor 12 towards the bow of the freighter by moving laterally the traversing conveyor 10 within panels 4a so that the end of said conveyor 10 is located right over main conveyor 12, as shown in full lines in FIG. 10, and at the same time by driving belt 30 to transfer the chips towards main conveyor 12 and from there towards the bow.

As illustrated in FIG. 9, tripper 14a in the regulated position of the hold, in connection with drive tripper 14b, cooperates with chute 20 at the position of conveyor 19 and with opening 21 of upper panel 4a over the hold (see FIG. 10). Thus the chips on main conveyor 12 are transferred from driven tripper 14b to conveyor 18 of self-travelling tripper 14a, as shown by the arrows in FIG. 9, and then the chips are led by way of conveyor 19 from opening 21 into the hold.

In order to deliver the chips supplied from opening 21 into the hold on the reverse side of main conveyor 12, i.e., to the position A in FIG. 10, traversing conveyor 10 must be moved to the position 10a shown in FIG. 10, and simultaneously belt 30 must be driven to transfer the chips toward position A.

Also, if conveyor 10 is moved to the position 10b, the chips can be directly loaded into the hold, right under opening 21, i.e., to the position B, with out the aid of traversing conveyor 10. Furthermore, it can be arranged, if necessary, that direct loading from subtraversing conveyor 19 to position B in the hold dispenses with upper panels 4a.

After the above operation the chips can be loaded into each hold without exception by moving trippers 14a and 14b, which are interconnected, to the position in the hold whereto the chips are loaded, and also by coordinating opening 21 to chute 20.

Loading into A and B in the hold in the stern of the freighter is enabled either by delivering the chips from chute 45 directly to a hatch 2a' (see FIG. 1) or from hopper 11 of upper hatch panels 4a to conveyor 10.

In the present invention the loading arrangement can be so disposed that the chips dropped from guide plate 27 may be received directly at the end of conveyor 10 by use of self-travelling tripper means 14a comprising only driven tripper 14b as shown in FIG. 9. In this case, however, it is necessary to load the chips at position B IN FIG. 10 by means of conveyor 10, and for this reason the arrangement must be such that almost the whole structure of traversing conveyor 10 may stand out from hatch panels 4a.

Such an arrangement brings about troubles not only in the supporting mechanism for conveyor 10 but also in the driving mechanism for moving laterally the conveyor. The trouble in the driving mechanism is because of a long stroke of the conveyor 10 to be moved.

The above-mentioned troubles can be removed in the following manner. Both trippers 14a, 14b should be arranged by spacing each tripper at a proper distance so that the chips can pass along the belt of the main conveyor regardless of the spacing of the trippers 14a, 14b. As has been explained before, tripper 13 of main conveyor 12, by the side of the hatches, includes self-travelling tripper 14a and driven tripper 14b. The former has subtraversing conveyor 19 to deliver the chips supplied from driven tripper 14b, connected with the tripper 14a, directly to the point in the hold near tripper means 13.

Figure 6:
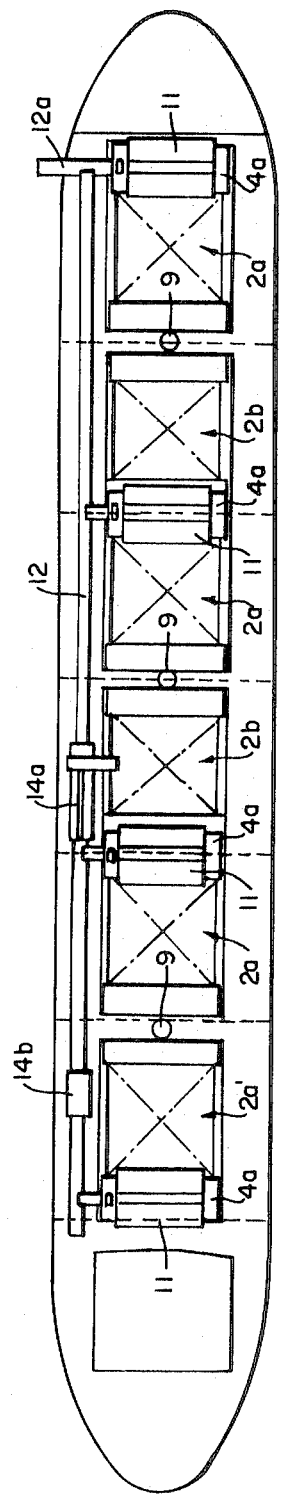
FIG. 6 is a plan view of the freighter shown in FIG. 5.

With regard to unloading, an exemplary embodiment of the present invention will be explained in the following. First, the hatches of each hold are opened as is shown in FIGS. 5 and 6, and upper panels 4a for cargo handling are moved somewhere else besides the hatches. Then endless belt 30 is driven to transfer the chips towards main conveyor 12 after hopper 11 is unfolded and traversing conveyor 10 is moved, whereby to locate the end of the latter over main conveyor 12. In the condition that self-travelling tripper 14a is spaced from driven tripper 14b, each deck crane 9 delivers the chips from the crane in charge of each hold into hopper 11 by means of the respective grab bucket 9a.

The chips delivered into hopper 11 are transferred from traversing conveyor 10 of each upper hatch panel 4a to main conveyor 12 and at last the chips are unloaded through this conveyor, and a shuttled conveyor outside the freighter. In this case part of the chips carried along main conveyor 12 will ride over sloped stock 24 of driven tripper 14b, however this does not constitute an obstacle in the transportation of the chips.

In the examples of embodiment given hereinbefore, upper hatch panels 4a for cargo handling are constructed so as to be moved to and located between at least two hatches 2a, 2b and be serviceable for two hatches in cargo handling, whereby to decrease the cost of the equipment. However it is possible to provide each hatch 2a, 2b with an upper hatch panel 4a.

The marine bulk cargo loading arrangement according to the present invention is, as will be clear from the foregoing description, of considerable use to load and unload cargo in a bulk freighter, and will have the effect of a sharp decrease in the cost of the necessary equipment.

What I claim is

1. A marine bulk cargo loading arrangement, such as in a bulk freighter, comprising, in combination, at least two covers for hatches at respective holds of the freighter, said covers being movable in the longitudinal direction of the freighter, and including hatch panels of two kinds, namely at least one hatch panel adapted only for the purpose of shutting the respective hatch, as well as at least one other hatch panel adapted both for shutting the respective hatch and for handling the cargo, a closable hopper for the cargo, and a traversing conveyor which has means associated therewith to deliver the cargo supplied from a main conveyor mounted by the side of said hatches through tripper means into the respective hold, as well as to deliver the cargo supplied from said hopper to said main conveyor.

2. The marine bulk cargo loading arrangement as defined in claim 1, wherein said traversing conveyor is laterally movable within said at least one other hatch panel.

3. The marine bulk cargo loading arrangement as defined in claim 1, further comprising means for moving said at least one other hatch panel over at least two hatches.

4. The marine bulk cargo handling arrangement as defined in claim 1, wherein said tripper means includes a driven tripper and a self-travelling tripper having a subtraversing conveyor to deliver the cargo supplied from said driven tripper, connected with said self-travelling tripper, directly to a point near said tripper means within the respective hold, wherein said trippers are spaced apart so that the cargo on said main conveyor can be transported along the belt of the same, regardless of the distance between said trippers.

5. The marine bulk cargo handling arrangement as defined in claim 4, wherein said at least one other hatch panel is provided with an opening for receiving the cargo that can be dropped from the end of said subtraversing conveyor, said traversing conveyor within said at least one other hatch panel being selectively movable to a position to receive the cargo from said opening, and to a position to supply the cargo from said opening directly to the respective hold without receiving it from said opening.